US008484730B1

(12) United States Patent
P. R.

(10) Patent No.: US 8,484,730 B1
(45) Date of Patent: Jul. 9, 2013

(54) SYSTEMS AND METHODS FOR REPORTING ONLINE BEHAVIOR

(75) Inventor: Ashwin P. R., Tamil Nadu (IN)

(73) Assignee: Symantec Corporation, Mountain View, CA (US)

( * ) Notice: Subject to any disclaimer, the term of this patent is extended or adjusted under 35 U.S.C. 154(b) by 144 days.

(21) Appl. No.: 13/045,056

(22) Filed: Mar. 10, 2011

(51) Int. Cl.
*G06F 11/00* (2006.01)
*H04N 7/16* (2006.01)
*G06F 12/14* (2006.01)

(52) U.S. Cl.
USPC ............... 726/22; 726/23; 726/24; 726/25; 726/26; 709/225

(58) Field of Classification Search
None
See application file for complete search history.

(56) References Cited

U.S. PATENT DOCUMENTS

| | | | |
|---|---|---|---|
| 7,269,851 B2 | 9/2007 | Ackroyd | |
| 7,761,912 B2 * | 7/2010 | Yee et al. | 726/11 |
| 7,831,412 B1 | 11/2010 | Sobel | |
| 2004/0015719 A1 * | 1/2004 | Lee et al. | 713/201 |
| 2005/0283831 A1 | 12/2005 | Ryu et al. | |
| 2006/0253584 A1 * | 11/2006 | Dixon et al. | 709/225 |
| 2008/0243920 A1 * | 10/2008 | Newman et al. | 707/104.1 |
| 2008/0282338 A1 * | 11/2008 | Beer | 726/12 |
| 2009/0187988 A1 * | 7/2009 | Hulten et al. | 726/22 |
| 2009/0328209 A1 * | 12/2009 | Nachenberg | 726/22 |
| 2010/0042931 A1 * | 2/2010 | Dixon et al. | 715/738 |
| 2010/0306846 A1 * | 12/2010 | Alperovitch et al. | 726/23 |
| 2012/0167210 A1 * | 6/2012 | Oro Garcia et al. | 726/22 |

OTHER PUBLICATIONS

William E. Sobel; U.S. Appl. No. 12/858,085; Systems and Methods for Digitally Signing Executables with Reputation Information; Aug. 17, 2010.
Dave Greenfield; Using Reputation to Change Web Surfing Habits; Team Think; Jun. 18, 2010.

* cited by examiner

*Primary Examiner* — Nathan Flynn
*Assistant Examiner* — Trang Doan
(74) *Attorney, Agent, or Firm* — ALG Intellectual Property, LLC

(57) ABSTRACT

A computer-implemented method for reporting online behavior may include identifying a user account subject to parental monitoring. The computer-implemented method may also include identifying a plurality of online resources accessed by the user account over a period of time. The computer-implemented method may further include determining a reputation for each of the plurality of online resources. The reputation may indicate a level of security threat. The computer-implemented method may additionally include generating an online behavior score for the user account based on the determining of the reputations. The online behavior score may indicate an overall level of security threat posed by online activity on the user account. Lastly, the computer-implemented method may include reporting the online behavior score to a predetermined contact associated with the user account. Various other methods, systems, and computer-readable media are also disclosed.

20 Claims, 7 Drawing Sheets

400

SYSTEMS AND METHODS FOR REPORTING ONLINE BEHAVIOR

BACKGROUND

The Internet may pose a threat to children and other users because online activities remain largely unmonitored, uncensored, and unregulated. For example, parents are frequently concerned that their children may be intentionally or inadvertently interacting with malicious or inappropriate content on the Internet, including inappropriate or malicious web sites, files, programs, media, and/or users.

In view of the above, several businesses have developed software and systems for monitoring a child's activity online and enforcing rules for regulating or monitoring that activity. For example, according to a conventional parental monitoring system, an installed software application might determine that a child is attempting to access a web site. The software application may then retrieve the web site without automatically displaying it to the child. The software application may then scan the web site for inappropriate content. If the web site passes these tests, the software application may then display the web site for the child.

Conventional parental monitoring systems such as those described above have several limitations. One significant drawback is that the systems may have a difficult time gauging security risks posed by children who may access malicious online resources. Accordingly, the instant disclosure identifies and addresses a need for additional and improved methods and systems for reporting online behavior.

SUMMARY

As will be described in greater detail below, the instant disclosure generally relates to systems and methods for reporting online behavior. For example, embodiments of the instant disclosure may detect an attempt by a child to access an online resource. Embodiments of the instant disclosure may then obtain a reputation for that online resource and produce an online behavior score based on at least that reputation. For example, a method for reporting online behavior may include: 1) identifying a user account subject to parental monitoring; 2) identifying a plurality of online resources accessed by the user account over a period of time; 3) determining a reputation for each of the plurality of online resources, the reputation indicating a level of security threat; 4) generating an online behavior score for the user account based on the determining of the reputations, the online behavior score indicating an overall level of security threat posed by online activity on the user account; and 5) reporting the online behavior score to a predetermined contact associated with the user account.

The method may include providing information identifying each online resource to an online resource reputation system that maintains reputation information for online resources. The method may further include receiving, from the online resource reputation system, a reputation score for each online resource.

The method may also include identifying a reputation threshold. The method may further include determining whether a reputation included within the determined reputations achieves the reputation threshold.

The method may also include automatically adjusting the user account's level of online access in response to the generating of the online behavior score. Automatically adjusting the user account's level of online access may include blocking or diminishing online access in general or specific to online resources with reputations that are determined to be malicious.

Reporting the online behavior score to the predetermined contact associated with the user account may include reporting at least one of a proportion of the online resources that are known to represent a security threat, a proportion of the online resources that are known to not represent a security threat, and a proportion of the online resources that are not known to represent or not represent a security threat.

The method may also include determining an appropriateness level of media content contained within the online resources, and generating the online behavior score for the user account may include using the appropriateness level to generate the online behavior score.

The overall level of security threat posed by the online account may indicate a likelihood that the online account will access an online resource with a reputation for being a security threat.

A system for reporting online behavior may include: 1) an identifying module programmed to identify a user account subject to parental monitoring and to identify a plurality of online resources accessed by the user account over a period of time; 2) a determining module programmed to determine a reputation for each of the plurality of online resources, the reputation indicating a level of security threat; 3) a generating module program to generate an online behavior score for the user account based on the determining of the reputations, the online behavior score indicating an overall level of security threat posed by online activity on the user account; 4) a reporting module programmed to report the online behavior score to a predetermined contact associated with the user account; and 5) at least one processor configured to execute the identifying module, the determining module, the generating module, and the reporting module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
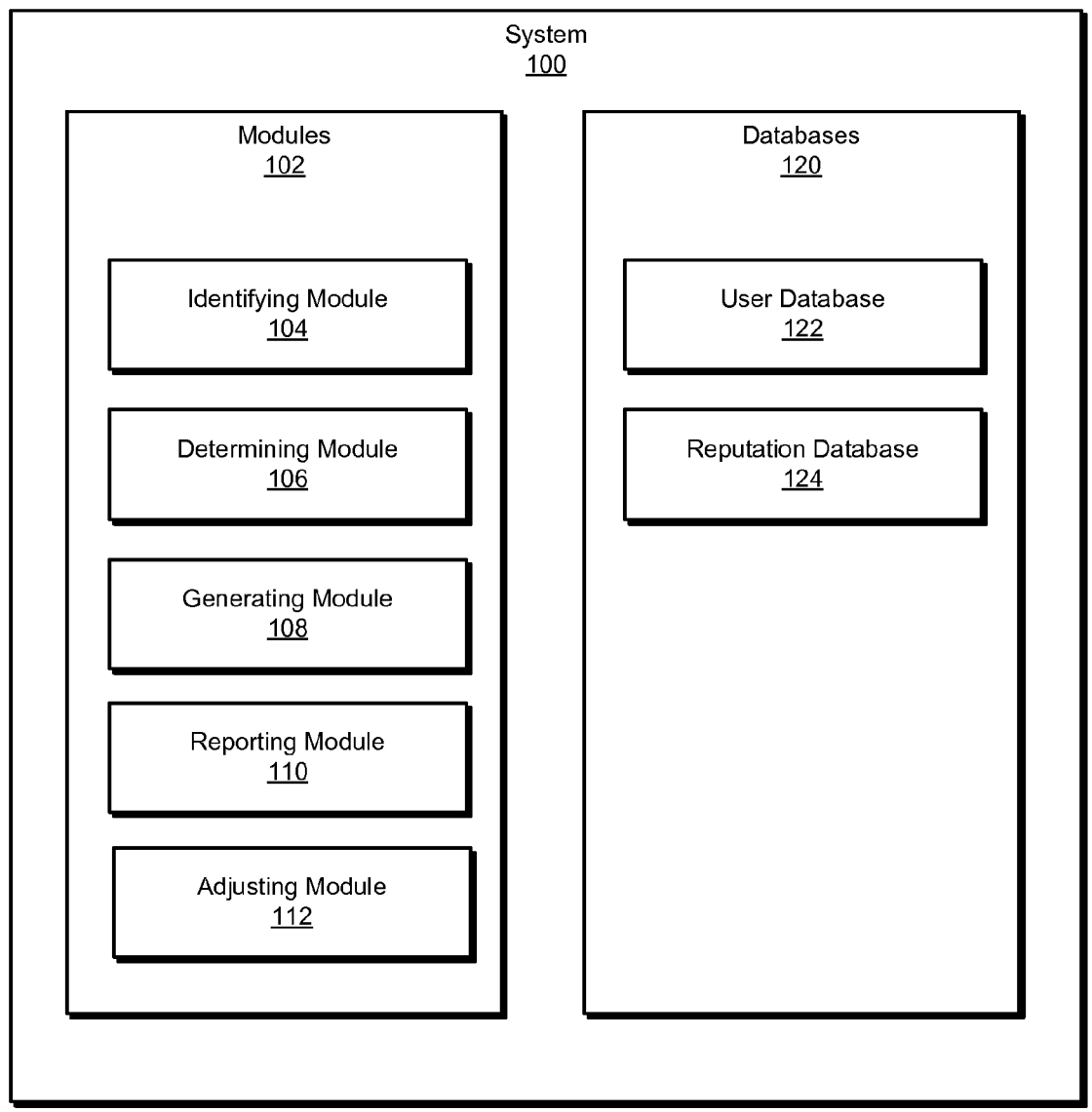
FIG. 1 is a block diagram of an exemplary system for reporting online behavior.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for reporting online behavior. For example, various systems described herein may: 1) identify a user account, such as a child's account, within a parental monitoring system; 2) identify websites and other resources accessed by the child's account; 3) determine a reputation for each of the online resources; 4) create, based on the reputations, an online behavior score for the child's account that indicates an overall level of security threat posed by the child's online activity; and 5) report the online behavior score to a parent or guardian associated with the child's account. The systems and methods may thereby enable parenting monitoring software to benefit from information provided by an online resource reputation database and to provide a simple and convenient indication of the overall appropriateness of a child's online activities.

Figure 2:
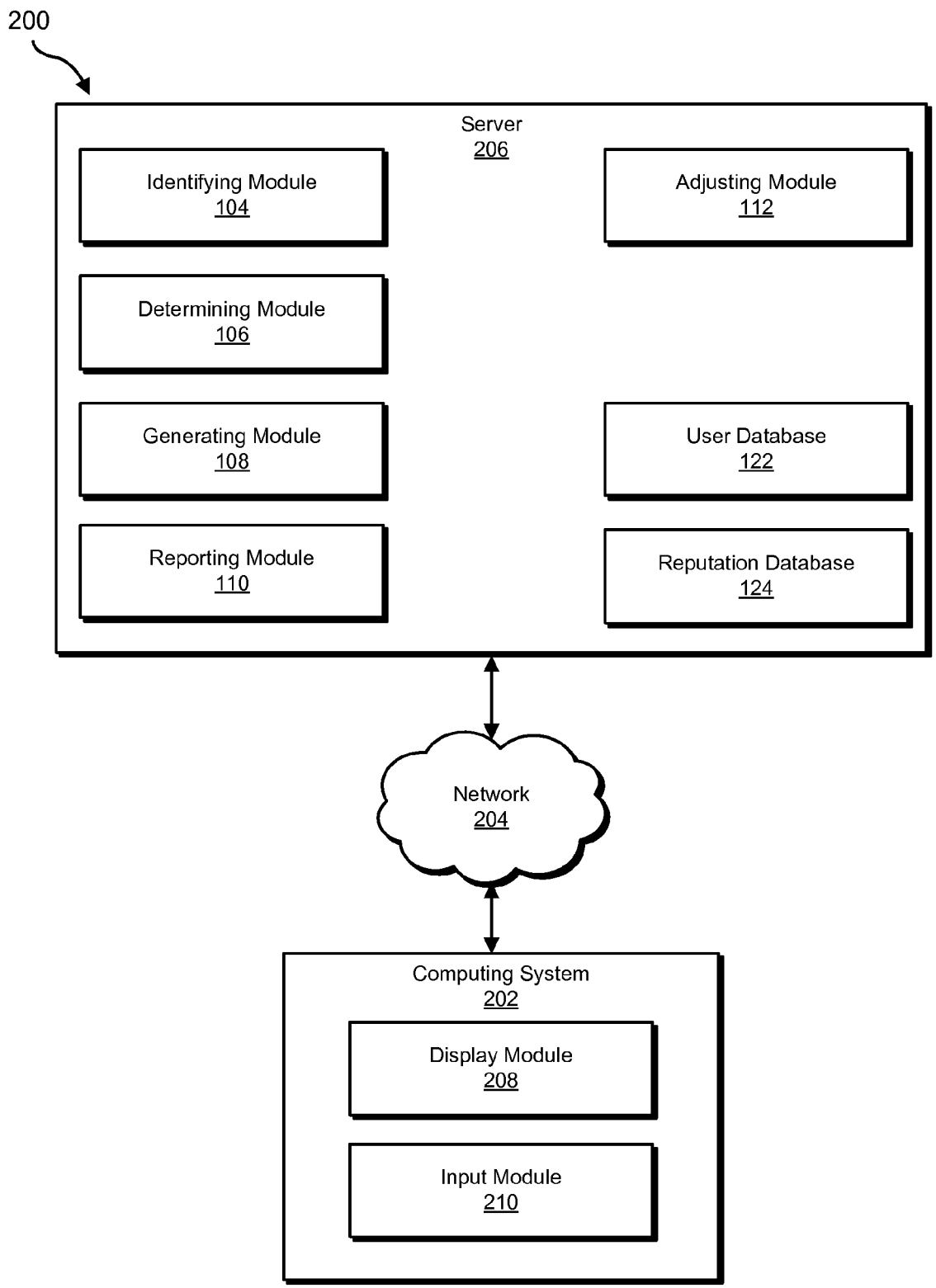
FIG. 2 is a block diagram of another exemplary system for reporting online behavior.

The following will provide, with reference to FIGS. 1-2, detailed descriptions of exemplary systems for reporting online behavior. Detailed descriptions of corresponding computer-implemented methods will also be provided in connection with FIG. 3. An example of the relationships between different layers of parental monitoring software will be described in connection with FIG. 4. Detailed descriptions of an exemplary graphical using interface for use in conjunction with the systems and methods described herein will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for reporting online behavior. As illustrated in this figure, exemplary system 100 may include one or more modules 102 for performing one or more tasks. For example, and as will be explained in greater detail below, system 100 may include an identifying module 104 programmed to identify a user account subject to parental monitoring and to identify a plurality of online resources accessed by the user account over a period of time. System 100 may also include a determining module 106 programmed to determine a reputation for each of the plurality of online resources. The reputation may indicate a level of security threat.

Additionally, system 100 may include a generating module 108 programmed to generate an online behavior score for the user account based on the determining of the reputations. The online behavior score may indicate an overall level of security threat posed by online activity on the user account. System 100 may also include a reporting module 110 programmed to report the online behavior score to a predetermined contact associated with the user account. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a user database 122 storing information about different users, including users within the parental monitoring system 100, such as those users that are subject to parental monitoring. System 100 may also include a reputation database 124 for storing information about reputations for online resources and other entities.

Databases 120 in FIG. 1 may represent a portion of one or more computing devices. For example, databases 120 may represent a portion of server 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a server 206 via a network 204. Server 206 may represent a parental monitoring system server for monitoring the online behavior of children using client systems included within the parental monitoring system. Computing system 202 may represent client systems that are monitored by the parental monitoring system. Although depicted as separate in FIG. 2, server 206 and computing system 202 may be combined so that the administrator uses the same computing system to administer parental monitoring software that monitors online behavior of children using the same computing system. Alternatively, parents may use other client systems distinct from a child's system that is subject to parental monitoring. Parents at those computing systems may receive reports from server 206, as discussed in detail below.

Server 206 may include identifying module 104, determining module 106, generating module 108, and reporting module 110. Identifying module 104 may be programmed to identify a user account subject to parental monitoring. For example, identifying module 104 may program server 206 to receive or otherwise identify user account credentials of a child using computing system 202. Identifying module 104 may also identify online resources accessed by the user account over a period of time by monitoring the online resource requests transmitted from computing system 202.

Determining module 106 may program server 206 to determine a reputation for each of the online resources such that the reputation indicates a level of security threat. For example, determining module 106 may transmit identifying information about the online resources to an online resource reputation system and, in response, receive respective reputations for the online resources.

Generating module 108 may program server 206 to generate an online behavior score for the user account based on the determining of the reputations. For example, generating module 108 may combine or average, or otherwise use as inputs into a formula, the reputations for the online resources to generate a single online behavior score for the user account.

Reporting module 110 may program server 206 to report the online behavior score to a predetermined contact associated with the user account. For example, reporting module 110 may transmit the online behavior score generated by generating module 108 to a parent at a client system (e.g., computing system 202).

Server 206 may also include user database 122 and reputation database 124. User database 122 may include information about online users, including users that access system 100. Reputation database 124 may include reputations for online resources such as web sites, files, programs, queries, and users, including users identified within user database 122. As discussed above, one or more of the modules and databases in server 206 may be included within computing system 202.

Server 206 generally represents any type or form of computing device which, in combination with computing system 202, may perform the methods disclosed in this application. Examples of server 206 include, without limitation, application servers and database servers configured to provide various database services and/or run certain software applications.

As shown in FIG. 2, computing system 202 may include a display module 208 and an input module 210. Display module 208 may provide output to a user at a client system in the form of computing system 202, such as a child subject to parental monitoring or a parent administering the parental monitoring system. Input module 210 may receive input at computing system 202 from a user, such as the parent or child discussed above.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer between server 206 and computing system 202. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202 and server 206.

Figure 3:
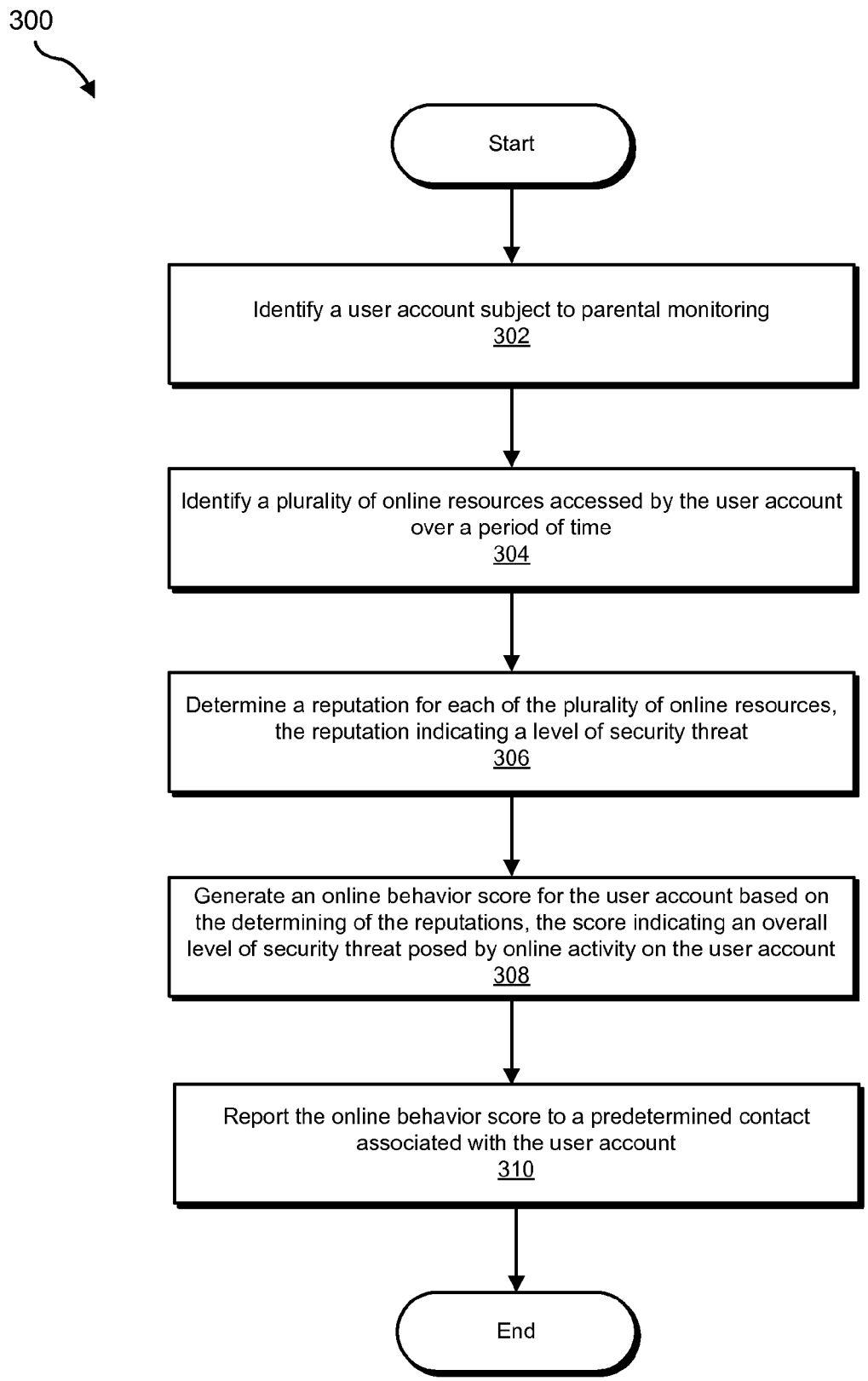
FIG. 3 is a flow diagram of an exemplary method for reporting online behavior.

FIG. 3 is a flow diagram of an exemplary computer-implemented method 300 for reporting online behavior. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a user account subject to parental monitoring. For example, at step 302, identifying module 104 may, as part of server 206 in FIG. 2, identify a user account that is subject to parental monitoring.

Identifying module 104 may identify the user account in a variety of manners. For example, identifying module 104 may determine that there is user activity at a computing system 202 that is uniquely associated with a particular user account. For example, a child may begin to use a cell phone device that is monitored by system 100 and that identifying module 104 uniquely associates with the child's user account. Identifying a user account may also comprise identifying a user (i.e. the user associated with the account).

Identifying module 104 may also identify a user account upon the entering of user account credentials. The user account credentials may indicate a user account that is created with, and managed by, system 100 or that is a more general user account for use on computing system 202. For example, the more general user account may be a user account associated with an operating system or a third party application (i.e., an application other than those that are part of an online security system). For example, identifying module 104 may identify a user account when a user, such as a child, enters log-in credentials to access an operating system such as WINDOWS 7 or an instant messaging program such as AOL INSTANT MESSENGER. Alternatively, identifying module 104 may identify a user account by identifying log-in credential at any point after a user logs into a computing system.

In the case that the user account is specific to system 100, the system may require a user to enter log-in credentials prior to obtaining any or complete access to computing system 202. For example, system 100 may diminish or eliminate a user's ability to use or access one or more software or hardware elements at computing system 202 unless the user submits identifying information, such as log-in credentials.

In the case of identifying a general user account that is not necessarily subject to parental monitoring, identifying module 104 may further determine whether the user account is subject to parental monitoring. For example, identifying module 104 may correlate the identified user account with a specific user account that is subject to parental monitoring within system 100. For example, identifying module 104 may attempt to correlate a user account of the operating system at computing system 202 with a user account within a parental monitoring software application.

Because children may access the same account from different client systems, identifying module 104 may also identify the same account when accessed at each of these different client systems. For example, identifying module 104 may identify a child's account, and activity on that account, when the child accesses the account through both the child's laptop and the child's cell phone.

At step 304, one or more of the systems described herein may identify a plurality of online resources accessed by the user account over a period of time. For example, identifying module 104 may identify a plurality of online resources accessed by the user account over a period of time.

Identifying module 104 may perform step 304 in a variety of manners. Identifying module 104 may determine all of the online resources that a user has accessed over a specific period of time. Alternatively, identifying module 104 may intermittently identify or sample various online resources that the user account has accessed over a period of time. Thus, the identified plurality of online resources need not be all of the resources that the user account accesses during a specific period of time. Identifying module 104 may also identify online resources that the user account unsuccessfully attempts to access. In some examples, identifying module 104 may determine which online resources a user has accessed by continuously monitoring user activity. Additionally or alternatively, identifying module 104 may harvest online history data from one or more applications.

Online resources that the user account accesses over a period of time may include web sites, programs, files, documents, and media content, as well as other users. Web sites, programs, files, documents, and media content may be identified or partially identified by complete or partial strings of bits or characters, or by digital fingerprint, such as a hash. Online resources may include users having online accounts with communication platforms, such as email, instant messaging, audio/video conferencing, and/or social networking web sites. Identifying module 104 may identify users in part by correlating user accounts to the same user across multiple platforms.

In one embodiment, online resources may include items or elements that the user has accessed, attempted to access, or expressed interest in, including search engine queries and/or the targets of search engine queries. For example, identifying module 104 may identify search engine queries, or other queries, that a user enters online. Determining module 106 may then determine a reputation for the search query or target of the search query, as discussed in detail below.

At step 306, one or more of the systems described herein may determine a reputation for each of the plurality of online resources. The reputation may indicate a level of security threat. For example, at step 306, determining module 106 may determine a reputation for each of the plurality of online resources.

In some embodiments, the term "reputation" may refer to a degree to which an online resource is considered malicious for a user account, as discussed in greater detail below. Additionally or alternatively, the term "reputation" may refer to information that conveys the opinion of a specific community (such as the user base of a security-software publisher) on the trustworthiness or legitimacy of an online resource, executable file, software publisher, and/or file source (such as a web domain or download link). Examples of reputation information include, without limitation, reputation scores, prevalence information (e.g., information that identifies the number or percentage of user devices within a community that contain (1) an instance of a particular file, (2) files provided by a particular software publisher, and/or (3) files obtained from a particular file source, such as a web domain), or any other information that may be used to identify a community's opinion on the trustworthiness or legitimacy of an online resource, file, software publisher, and/or file source.

Determining module 106 may determine the reputations of the online resources in a variety of manners. For example, determining module 106 may determine a reputation for an online resource by determining a degree to which an online resource is malicious for the user account. An online resource may be considered malicious if the online resource contains any type of malware, including computer worms, trojans, viruses, and spyware. Malware may refer to software and other functionality that harms or reduces the functionality of the computing system. Malware may harm a computing system by specifically disabling or reducing the functionality of a software, hardware, and/or other computing component. Alternatively, malware may simply harm a computer by consuming system resources, which may result in sluggish performance. Further, malware may also refer to any software or code that performs any unauthorized or undesired action at a computing system, even if the action is invisible or undetected by the user, and even if the action does not result in any noticeable, lasting, and/or otherwise physical or conspicuous harm.

Determining a reputation of an online resource may include determining a degree to which the online resource is inappropriate. The appropriateness of an online resource may refer to a degree of suitability of the online resource for children subject to parental monitoring by system 100, such as the degree of suitability as determined by a parent of the child. Inappropriate online resources may include online resources having content with a violent, sexual, sacrilegious, adult (including cursing, smoking, and/or drinking), or otherwise offensive or inappropriate character with respect to children. Inappropriate online resources may also include online resources that have been identified by a parent or administrator of parental monitoring software as inappropriate according to the administrator's idiosyncratic tastes or parenting preferences.

Determining module 106 may determine a reputation for each of the online resources continuously as the online resources are attempted to be accessed by a user account or, alternatively, according to a predetermined schedule, including at a specified interval. For example, an agent at a child's computing system 202 may collect requests for online resources at computing system 202 and transmit the collection to server 206 at a specified time (e.g., daily). Upon receiving the collection of online resource requests, server 206 may consult with an online resource reputation system to determine reputations for all or some of the designated online resources. Server 206 may include the online resource reputation system or, alternatively, may transmit a request to a third party or remote online resource reputation system to retrieve the requested reputations. Upon receiving the reputations, server 206 may transmit information about the reputations, including an online behavior score, to users of system 100, including children subject to parental monitoring, and the parents that are administering the monitoring, as discussed in detail below.

In a reputation-based security system, such as the online resource reputation system discussed above, a security-software vendor may attempt to determine the trustworthiness and/or legitimacy of an online resource by collecting, aggregating, and analyzing data from potentially millions of user devices within a community, such as the security-software vendor's user base. For example, by determining an online resource's origin, age, and prevalence within the community (such as whether the file is predominantly found on at-risk or "unhealthy" machines within the community), among other details, a security-software vendor may gain a fairly accurate understanding as to the trustworthiness of the online resource.

The online resource reputation system may generate reputation information for online resources by collecting, aggregating, and analyzing data from user devices within a community (such as the user base of a security-software publisher). Examples of data gathered from user devices within a community that may be used to generate reputation information include, without limitation, information that identifies the overall health of a user device (i.e., information that identifies the performance, stability, and/or state of security of the user device), information that identifies the resources stored on a user device (including information that identifies the publisher and/or source of origin of such files), information that identifies the impact of an online resource on the health of a user device (e.g., information that identifies the health of the user device both before and after the online resource is stored on the user device), and any other information that may be used to evaluate the trustworthiness of an online resource. In some examples, by collecting, aggregating, and analyzing this data from potentially millions of user devices within a community (such as the user base of a security-software publisher), reputation services may be able to gain a fairly accurate understanding as to the trustworthiness of an online resource.

Figure 4:
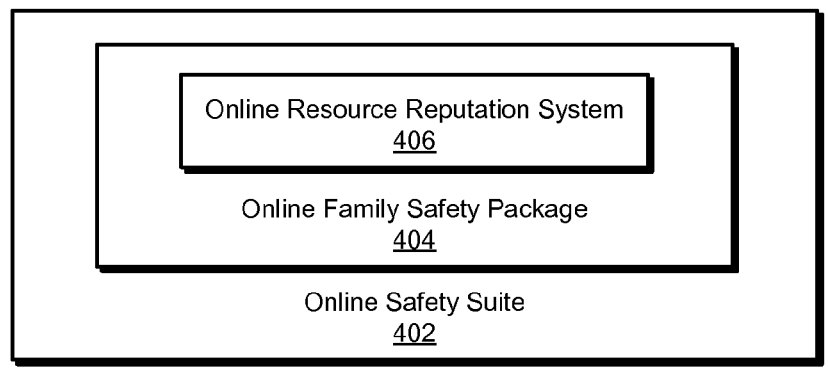
FIG. 4 is a block diagram illustrating the relationships between different levels of online security software.

FIG. 4 is a block diagram illustrating the relationships between various layers of online security software, including an online resource reputation system 406. As shown in FIG. 4, online resource reputation system 406 may be included within an online family safety software package 404, which may be implemented via server 206, as discussed above.

As discussed above, online resource reputation system 406 and online family safety package 404 may provide bidirectional feedback between each other. For example, online resource reputation system 406 may provide reputations for online resources in response to queries from online family safety package 404 regarding specific online resources. In turn, installed instances of online family safety package 404 at various computers (i.e. around the country or around the world) may newly encounter online resources, including those that are malicious and/or inappropriate. These instances may then transmit informative reports on these interactions to online resource reputation system 406. Reputation system 406 may then use these reports to update and manage the reputations for online resources that it provides to the various instances of safety package 404. In this way, online resource reputation system 406 and online family safety package 404 may provide helpful feedback to each other, and each instance of the safety package 404 may benefit from the inputs of all other instances reporting to online resource reputation system 406.

As shown in FIG. 4, online resource reputation system 406 and online family safety package 404 may be included within an online safety suite of programs. Parents may purchase or license a complete suite of programs for total protection against malicious and inappropriate online resources. Alternatively, online resource reputation system 406 and online family safety package 404 may be provided on a free or trial basis, so that parents may upgrade to purchasing or licensing online safety suite 402 upon discovering the extent of their child's interactions with malicious and inappropriate online resources.

Online resource reputation system 406 may manage and maintain a database of information about reputations for online resources, such as reputation database 122, in a variety of manners. For example, online resource reputation system 406 may receive large quantities of reports about the reputations of online resources from users of parental monitoring and online security (e.g. antivirus and anti-spyware) systems. These systems may automatically, or in combination with user input, submit a report to the online resource reputation system upon encountering an online resource. For example, a third party computing system may submit a report identifying a particular web site as being associated with virus activity after the computing system is infected with a virus upon accessing the web site.

Online resource reputation system 406 may also actively scan the Internet, such as by spidering web sites, to determine reputations for online resources without doing so in response to reports submitted by users.

Online resource reputation system 406 may identify online resources using a common string of bits or characters or a digital fingerprint such as a hash. Online resource reputation system 406 may identify web sites by at least part of the website's URL or content. Reputation system 406 may also identify files by partial or complete file name. Reputation system 406 may also correlate different user accounts associated with the same user across different platforms to determine a reputation for that particular user.

Online resource reputation system 406 may be specific to a parental monitoring system implemented by system 100. Accordingly, reputation system 406 may be included within server 206. Alternatively, reputation system 406 may include an independent, third party system that provides reputation information to the parental monitoring system, such as in exchange for a fee.

Online resource reputation system 406 may determine a reputation for an online resource by evaluating different factors, including the time, frequency, and egregiousness of a security threat posed by the online resource. A security threat may refer to at least the maliciousness of the online resource, as discussed above. Reputation system 406 may evaluate the time of the security threat so that older security threats result in a better reputation than newer security threats. Reputation system 406 may evaluate the frequency of security threats so that more frequent security threats result in a worse reputation. Lastly, reputation system 406 may evaluate the egregiousness of security threats so that more egregious security threats (i.e., security threats that are more malicious) result in a worse reputation.

Determining module 104 may determine a reputation for an online resource by accessing or requesting a predetermined or precalculated reputation based on a history of security threats, or the lack thereof, associated with the online resource. Alternatively, determining module 104 may newly create a reputation for the online resource by actively scanning, retrieving, analyzing, and/or evaluating the online resource for maliciousness and/or inappropriateness.

At step 308, one or more of the systems described herein may generate an online behavior score for the user account based on the determining of the reputations. The online behavior score may indicate an overall level of security threat posed by online activities from the user account. For example, at step 308, generating module 106 may generate an online behavior score for the user account based on the determining of the reputations.

Generating module 108 may generate an online behavior score for the user account in a variety of manners. For example, generating module 108 may generally combine or aggregate reputations for the various online resources to create an online behavior score that represents a combined, aggregate, and/or average or representative reputation. Generating module 108 may also use some or all of the reputations for the online resources as inputs into a formula or business logic to create the online behavior score. The formula may include weights so that different factors or reputations are weighted more heavily than others. For example, similar to the determining of a single reputation for an online resource as discussed above, generating module 108 may weigh the reputations of online resources that a user account accesses more recently more heavily than the reputations of online resources that the user account accesses less recently.

Generating module 108 may create the online behavior score in the form of a number, letter, icon, and/or other symbol. For example, generating module 108 may generate an integer or decimal number that reflects a general, overall, or average reputation, or level of maliciousness or inappropriateness, for the online resources that the user account accessed. Generating module 108 may also create the online behavior score in the form of a letter similar to a grade school report (e.g., A+ or C−). Generating module 108 may also report a confidence level in the online behavior score together with the online behavior score or may factor in the confidence level to the generating of the online behavior score. For example, a confidence level might indicate that online resource reputation system 406 suspects that a particular online resource has a bad reputation for maliciousness or inappropriateness but that the system cannot be very confident in the suspicion.

Generating module 108 may also generate the online behavior score based on a threshold level, such as a threshold online behavior score. For example, generating module 108 may first generate a number along a spectrum with a high resolution (e.g., 1-1000). Generating module 108 may then determine whether the number along that spectrum achieves a particular threshold. For example, generating module 108 may assume that a user account associated with a generated high resolution number of 673 or more has a bad reputation for maliciousness and/or inappropriateness.

Generating module 108 may also generate an online behavior score for a user, as opposed to a user account. For example, generating module 108 may generate an online behavior score by combining and/or averaging multiple online behavior scores for multiple accounts associated with the user.

In an alternative embodiment, generating module 108 may also generate multiple online behavior scores. For example, generating module 108 may generate respective scores for maliciousness and inappropriateness. Generating module 108 may also generate different online behavior scores for different types of maliciousness or inappropriateness. For example, generating module 108 may generate different online behavior scores for overall indications or reputations for computer worm, trojan, virus, and/or spyware activity, as well as respective online behavior scores for sexual and/or violent content.

Generating module 108 may also generate the online behavior score based on information about the user account and/or a behavior pattern or usage history of the user account (or a user of the user account) prior to the collecting of requests for online resources across a period of time in determining reputations for those particular online resources. For example, prior to the collecting and determining, a user account previously had been known to access online resources with bad reputations, such as online resources with reputations for a particular kind of malicious or inappropriate content. The user account may also be known to have accessed (or attempted to access) specific online resources with bad reputations. Generating module 108 may generate the online behavior score based on information about that kind of prior history. For example, generating module 108 may indicate a worse online behavior score based on the fact that the user account accessed or attempted to access an online resource that is the same as, or the same kind as, an online resource that the user account was known to have previously accessed and/or warned about. Generating module 108 and/or administrators of the parental monitoring software may then infer that the child accessed the online resource intentionally, and not inadvertently, and in violation of the previous warning and/or reprimand.

Generating module 108 may also generate the online behavior score to indicate, or base the score on, an estimation of how likely the user account will be to access the same or similar online resources with bad reputations in the future. Generating module 108 may base the estimation of likelihood on factors including: a degree to which the online resource is known to be accessed inadvertently (such as an inconspicuous computer virus) or intentionally (detecting of the URL into the address browser for an adult web site), an estimated degree of desirability for the online resource to the user (for example, a user may be more likely to desire to visit an adult web site again than to desire to visit a virus infested web site again), and/or profile characteristics, a behavioral pattern, and/or a usage pattern for the user account (for example, a child with a long history of frequently accessing online resources with bad reputations will be estimated to be more likely to access the same or similar online resources in the future).

At step 310, one or more of the systems described herein may report the online behavior score to a predetermined contact associated with the user account. For example, at step 310, reporting module 110 may report the online behavior score to a predetermined contact.

Reporting module 110 may report the online behavior score to the predetermined contact in a variety of manners. For example, reporting module 110 may retrieve contact information for the predetermined contact from user database 122, which may associate predetermined contacts with users subject to parental monitoring. Parents or administrators of the parental monitoring system may designate themselves or other parents or guardians as the predetermined contact. Multiple predetermined contacts may be designated and notified of the online behavior score.

In the absence of a predetermined contact that is designated by the parent or guardian of the child, reporting module 110 may attempt to identify an alternative predetermined or newly determined contact for reporting. For example, reporting module 110 may consult with online resource reputation system 406, government authorities, the company or business that sells, licenses, and/or manages the parental monitoring system, and/or child protective services or child advocacy groups to determine an alternative contact. Reporting module 110 may also consult with databases, such as social networking web sites, to determine other relatives or contacts that are associated with the child. Reporting module 110 may then attempt to determine whether any of these contacts are known to be in a position to supervise or act as a guardian or caregiver for the child (e.g., are of a sufficient age to do so or are registered with the parental monitoring system as guardians).

Upon identifying the predetermined contact, reporting module 110 may transmit information about the online behavior score to the predetermined contact. The information may indicate an absolute or relative number of online resources that are known to be good, known to be malicious, and/or not known to be either good or malicious.

Information about the reputation of a particular online resource, and/or a continuously generated online behavior score, may also be presented to the child at the child's computing system as the child engages in online activity. Thus, the child may be notified immediately that a web site or other online resource that the child is engaging with has a good or bad or unknown reputation. The child may also be warned after attempting to access an online resource with a reputation that is known to be bad. By displaying the online behavior score to the child, the child may gauge how well he or she is avoiding online resources with bad reputations, as well as the degree to which the child's online behavior may be reported, and/or distressing, to the child's parent, guardian, and/or predetermined contact.

Reporting module 110 may report the online behavior score to the parent or guardian using any method of digital and/or traditional communication, including email, SMS, instant messaging, social networking, voice message, telephone call, and/or paper mail.

Reporting the online behavior score to the predetermined contact may also include presenting the online behavior score to parents or guardians who access a management center, such as a web site, for managing the parental monitoring system. At the management center, the parents or guardians may obtain the online behavior score and/or some or all of any other logged information relating to the child's online behavior.

For example, the management center may indicate logs with the details of the child's attempts to access online resources, including keystrokes, web sites, files downloaded, programs executed, and other users with whom the child interacted, as well as the times, computing devices, and other details associated with these interactions.

The management center may also allow the parent or guardian to block or diminish general or specific online access in response to the child's online behavior. For example, the parent or guardian may block or diminish all access to the Internet or other online services. Alternatively, the parent or guardian may block or diminish access to specific online resources or services, including the same or similar online resources with bad reputations that the child is identified as having accessed. The parent or guardian may also disable or diminish functionality for media players or other programs or files that are the same as or similar to those files associated with bad reputations that the child accessed (e.g., such as by disabling the playing of videos or disabling the execution of new or unknown programs). As shown in FIG. 1, the parental monitoring system may also include an adjusting module 112 programmed to autonomously adjust the child's level of online access, as discussed above, without the parent or guardian manually doing so.

Through the management center, the parent or guardian may also adjust a level of reporting or monitoring of the child's online behavior. For example, upon learning that the child has an online behavior score indicating a worse reputation for accessing malicious or inappropriate online resources, a parent or guardian may increase the rate or level of monitoring and reporting the child's online activity. For example, a parent or guardian may indicate that other contacts, such as the child's other family members, other parent, and/or other contacts on a social networking web site, are to be notified of future online activity of a designated type.

Figure 5:
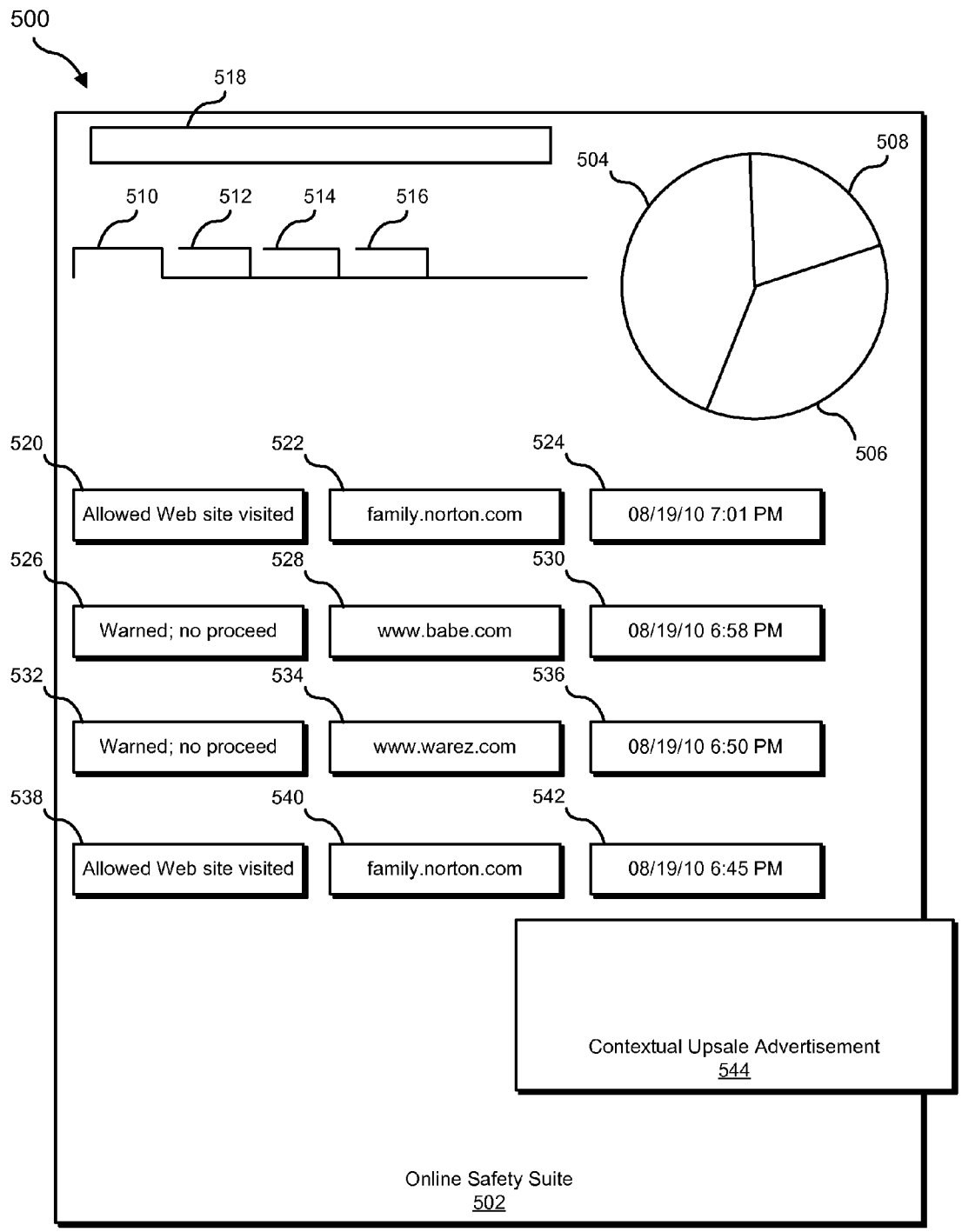
FIG. 5 is a block diagram of a graphical user interface for reporting online behavior.

FIG. 5 is an exemplary illustration of a graphical user interface (GUI) for using system 100, as discussed above. GUI 500 may represent the management web site for managing the parenting monitoring system, as discussed above.

As shown in FIG. 5, GUI 500 may include an address bar 518 for entering a web site URL. For example, the parent or guardian that administers the parental monitoring software may enter the URL for the management web site to access that web site. Upon attempting to access the management web site, the parent or guardian may be prompted for log-in credentials to authenticate the parent or guardian as an administrator for the parental monitoring software.

Upon authentication, various items about the child's online behavior may be displayed for the parent or guardian. For example, the child's online behavior score may be displayed in the form of a portion of the pie chart 504 that indicates a proportion of online resources that the child accessed or attempted to access that are known to have bad reputations. Similarly, a portion of the pie chart 506 may indicate the proportion of the online resources that are known to have good reputations. Similarly, a third portion 508 of the pie chart may indicate a proportion of the online resources that are not known to have either good reputations or bad reputations.

GUI 500 may also include display elements 520-542 that indicate the nature of an online event or activity, the web site associated with the online event, and a time at which the event or activity occurred. For example, the display elements 520, 526, 532, and 538 in the first column indicate the nature of a first online event or activity. For example, display element 520 indicates that an allowed web site was visited by the child. Display element 522 in the second column indicates that the allowed web site was "family.norton.com." Display element 524 indicates that the child visited the allowed web site at 08/19/10 7:01 PM.

In contrast, display element 526 indicates that the child attempted to access a web site with a reputation that is known to be bad. The child was warned and did not proceed to access the web site. Display element 528 in the second column indicates that the inappropriate web site was "www.babe.com." Similarly, display element 530 indicates the time when the child attempted to access the inappropriate web site. The other two rows of display elements in GUI 500 describe similar events at different times.

GUI 500 may also include tabs 510, 512, 514, and 516. As shown in FIG. 5, the first tab 510 is currently selected. A parent or administrator reviewing logs may select between different kinds of online events by selecting different ones of the tabs. For example, tab 510 may indicate "all activity," tab 512 may indicate "web" activity, tab 514 may indicate "search engine" activity, and tab 516 may indicate "instant messaging" activity. Upon selecting any of these tabs, the items in the columns below in GUI 500 may alter to reflect the different kind of activity, while still explaining whether the activity resulted in allowance, blocking, or warning, and still indicating the time when the activity occurred.

GUI 500 may also include contextual upsale advertisement 544 that provides an opportunity for a user of the management web site to purchase or upgrade online security services or software in response to learning about a child's online behavior. The management web site may modify the nature, size, or conspicuousness of contextual upsale advertisement 544 based on the details of the child's online behavior. The management web site may also modify the terms of the offer for sale or license based on the details of the child's online behavior.

For example, if GUI 500 indicates that the child has attempted to access or accessed a larger amount of online resources with bad or unknown reputations, the user's incentive to purchase or upgrade online security services or software may be increased, indicating greater potential demand. In response, the web site and/or system 100 may increase the price to reflect the heightened demand or may lower the price to maximize closure with sales prospects that are most likely to make a purchase.

While the above description has been provided for ease of discussion, the entirety of the disclosed subject matter is not necessarily limited to the embodiments discussed above. For example, although the above description has focused on parents, system 100 may be used with any guardian or caregiver for a child. Further, system 100 may be used with persons other than children, including anyone in a supervised position, such as an employee, inmate, patient, parolee, or disabled person. One of ordinary skill in the art would understand that these substitutions or adjustments are within the spirit and literal disclosure of the various inventions described herein.

Figure 6:
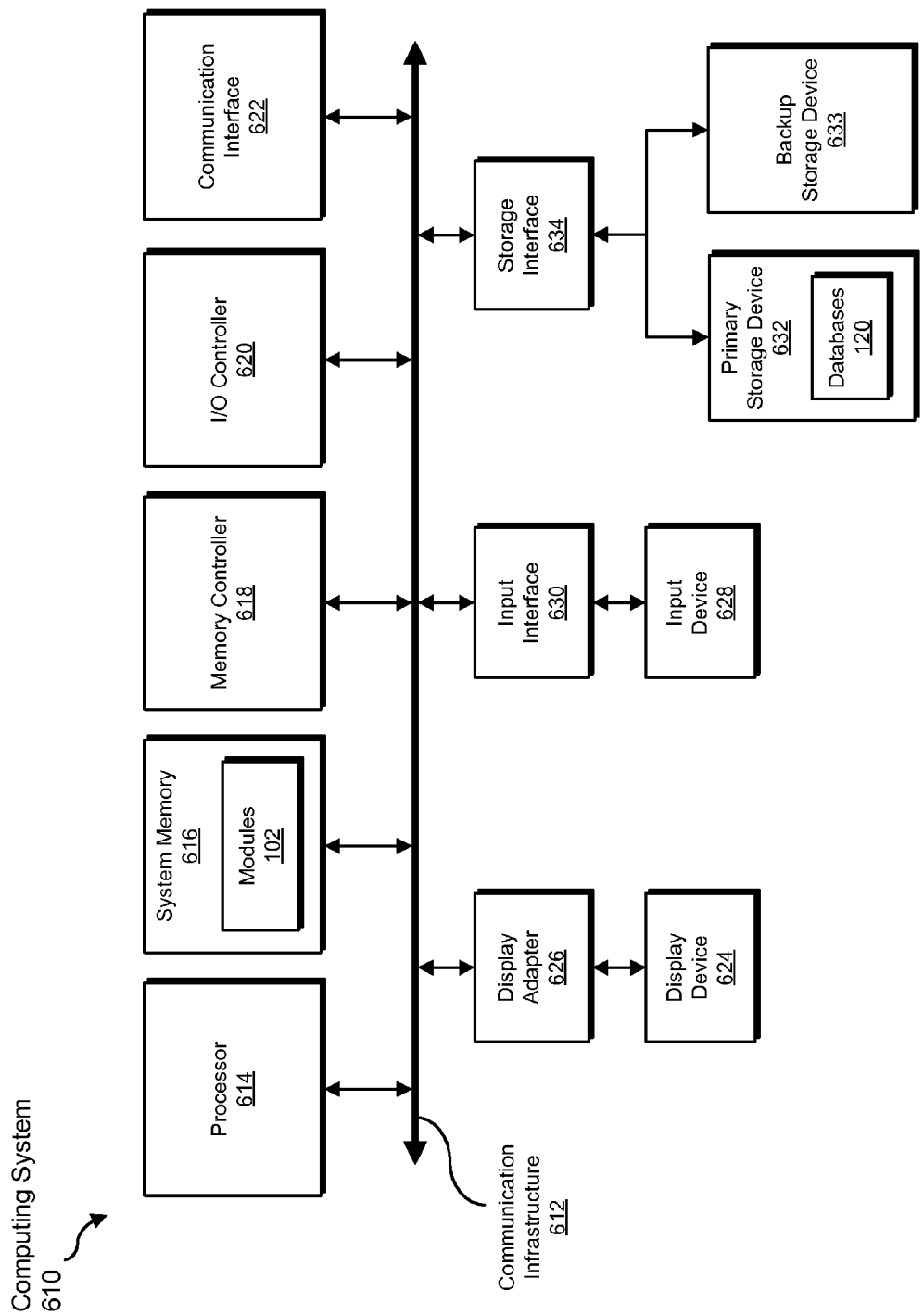
FIG. 6 is a diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, generating, reporting, providing, receiving, adjusting, and using steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, generating, reporting, providing, receiving, adjusting, and using.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, determining, generating, reporting, providing, receiving, adjusting, and using steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, generating, reporting, providing, receiving, adjusting, and using steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, generating, reporting, providing, receiving, adjusting, and using steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, determining, generating, reporting, providing, receiving, adjusting, and using steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
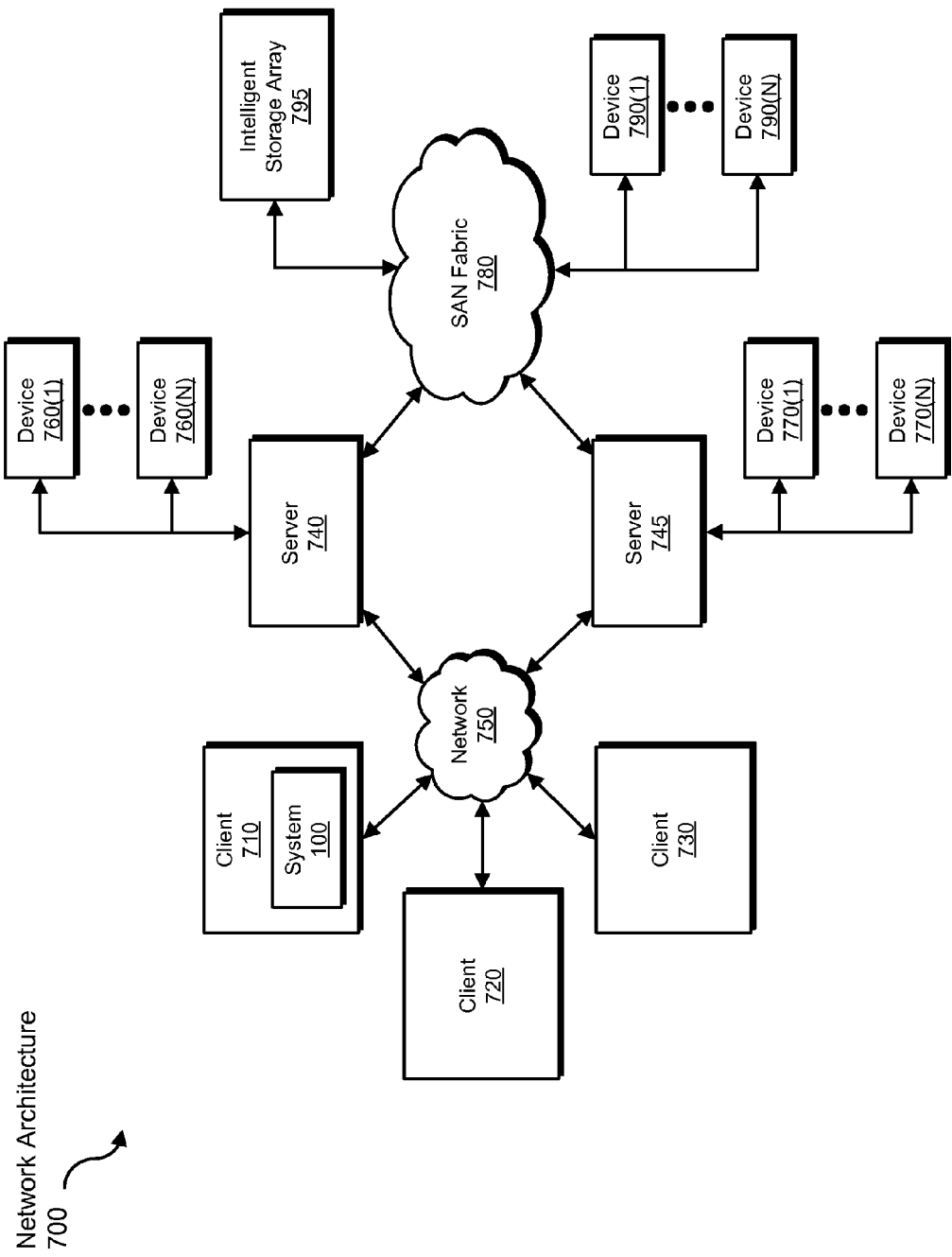
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, generating, reporting, providing, receiving, adjusting, and using steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for reporting online behavior.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, generating module 108 may transform reputation data about online resources into an online behavior score for a user account.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reporting online behavior, at least a portion of the method being performed by a computing device comprising at least one processor, the method comprising:
   identifying a user account subject to parental monitoring;
   identifying a plurality of online resources accessed by the user account over a period of time;
   maintaining a reputation database by collecting, aggregating, and analyzing information about each of the plurality of online resources from user devices within a community;
   determining a reputation for each of the plurality of online resources, wherein:
      the reputation indicates a level of security threat;
      determining the reputation comprises providing information identifying each online resource to an online resource reputation system that maintains reputation information for online resources and receiving, from the online resource reputation system, a reputation score for each online resource;
   generating an online behavior score for the user account based on the reputation score for each online resource in the plurality of online resources, the online behavior score indicating an overall level of security threat posed by online activity on the user account;
   reporting the online behavior score to a predetermined contact associated with the user account.

2. The method according to claim 1, wherein the information about each of the plurality of online resources from the user devices within the community comprises information that identifies the impact of each online resource in the plurality of online resources on the health of one or more user devices.

3. The method according to claim 1, wherein generating the online behavior score for the user account based on the reputation score for each online resource in the plurality of online resources comprises:
   identifying a reputation threshold;
   determining whether any reputation included within the reputations for each of the plurality of online resources achieves the reputation threshold.

4. The method according to claim 1, further comprising automatically adjusting the user account's level of online access in response to the generating of the online behavior score.

5. The method according to claim 1, wherein reporting the online behavior score to the predetermined contact associated with the user account comprises reporting at least one of:
- a proportion of the online resources that are known to represent a security threat;
- a proportion of the online resources that are known to not represent a security threat;
- a proportion of the online resources that are not known to represent or not represent a security threat.

6. The method according to claim 1, further comprising determining an appropriateness level of media content contained within the online resources, wherein generating the online behavior score for the user account comprises using the appropriateness level to generate the online behavior score.

7. The method according to claim 1, wherein the overall level of security threat posed by the online activity on the user account indicates a likelihood that the user account will access an online resource with a reputation for being a security threat.

8. A system for reporting online behavior comprising:
- an identifying module programmed to identify a user account subject to parental monitoring, and to identify a plurality of online resources accessed by the user account over a period of time;
- a resource reputation module programmed to maintain a reputation database by collecting, aggregating, and analyzing information about each of the plurality of online resources from user devices within a community;
- a determining module programmed to determine a reputation for each of the plurality of online resources, wherein:
  - the reputation indicates a level of security threat;
  - the determining module determines the reputation by providing information identifying each online resource to an online resource reputation system that maintains reputation information for online resources and by receiving, from the online resource reputation system, a reputation score for each online resource;
- a generating module programmed to generate an online behavior score for the user account based on the reputation score for each online resource in the plurality of online resources, the online behavior score indicating an overall level of security threat posed by online activity on the user account;
- a reporting module programmed to report the online behavior score to a predetermined contact associated with the user account;
- at least one processor configured to execute the identifying module, the determining module, the generating module, and the reporting module.

9. The system according to claim 8, wherein the information about each of the plurality of online resources from the user devices within the community comprises information that identifies the impact of each online resource in the plurality of online resources on the health of one or more user devices.

10. The system according to claim 8, wherein the generating module is programmed to generate the online behavior score for the user account based on the reputation score for each online resource in the plurality of online resources at least in part by:
- identifying a reputation threshold;
- determining whether any reputation included within the reputations for each of the plurality of online resources achieves the reputation threshold.

11. The system according to claim 8, further comprising an adjusting module programmed to automatically adjust the user account's level of online access in response to the generating of the online behavior score.

12. The system according to claim 8, wherein the reporting module is programmed to report the online behavior score to the predetermined contact associated with the user account by reporting at least one of:
- a proportion of the online resources that are known to represent a security threat;
- a proportion of the online resources that are known to not represent a security threat;
- a proportion of the online resources that are not known to represent or not represent a security threat.

13. The system according to claim 8, wherein:
- the determining module is further programmed to determine an appropriateness level of media content contained within the online resources;
- the generating module is programmed to generate the online behavior score for the user account using the appropriateness level to generate the online behavior score.

14. The system according to claim 8, wherein the overall level of security threat posed by the online activity on the user account indicates a likelihood that the user account will access an online resource with a reputation for being a security threat.

15. A non-transitory computer-readable-storage medium comprising one or more computer-executable instructions that, when executed by at least one processor of a computing device, cause the computing device to:
- identify a user account subject to parental monitoring;
- identify a plurality of online resources accessed by the user account over a period of time;
- maintain a reputation database by collecting, aggregating, and analyzing information about each of the plurality of online resources from user devices within a community;
- determine a reputation for each of the plurality of online resources, wherein:
  - the reputation indicates a level of security threat;
  - the determination of the reputation comprises providing information identifying each online resource to an online resource reputation system that maintains reputation information for online resources and receiving, from the online resource reputation system, a reputation score for each online resource;
- generate an online behavior score for the user account based on the reputation score for each online resource in the plurality of online resources, the online behavior score indicating an overall level of security threat posed by online activity on the user account;
- report the online behavior score to a predetermined contact associated with the user account.

16. The non-transitory computer-readable-storage medium according to claim 15, wherein the information about each of the plurality of online resources from the user devices within the community comprises information that identifies the impact of each online resource in the plurality of online resources on the health of one or more user devices.

17. The non-transitory computer-readable-storage medium according to claim 15, wherein the computer-executable instructions that cause the computing device to generate the online behavior score for the user account based on the reputation score for each online resource in the plurality of online resources comprise instructions that cause the computing device to:
- identify a reputation threshold;

determine whether any reputation included within the reputations for each of the plurality of online resources achieves the reputation threshold.

18. The non-transitory computer-readable-storage medium according to claim 15, further comprising computer-executable instructions that, when executed by at least one processor of a computing device, cause the computing device to automatically adjust the user account's level of online access in response to the generating of the online behavior score.

19. The non-transitory computer-readable-storage medium according to claim 15, wherein the instructions causing the computing device to report the online behavior score to the predetermined contact associated with the user account cause the computing device to report at least one of:
- a proportion of the online resources that are known to represent a security threat;
- a proportion of the online resources that are known to not represent a security threat;
- a proportion of the online resources that are not known to represent or not represent a security threat.

20. The non-transitory computer-readable-storage medium according to claim 15, further comprising computer-executable instructions that, when executed by at least one processor of a computing device, cause the computing device to determine an appropriateness level of media content contained within the online resources, wherein the computer-executable instructions that cause the computing device to generate the online behavior score for the user account cause the computing device to use the appropriateness level to generate the online behavior score.

* * * * *